3,318,893
HYDROXY ALUMINUM NICOTINATE SALICYLATE AND METHOD OF PREPARING THE SAME
James M. Holbert, Lookout Mountain, and Benjamin H. Gross, Chattanooga, Tenn., assignors to Chattem Drug & Chemical Company, a corporation of Tennessee
No Drawing. Filed Oct. 28, 1964, Ser. No. 407,237
5 Claims. (Cl. 260—270)

The present invention relates to an improved organo-aluminum compound and to a method for preparing the same.

The invention deals specifically with the preparation of a compound hydroxy aluminum nicotinate salicylate having the formula:

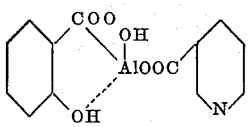

The compound hydroxy aluminum nicotinate salicylate is rather unique among organo-aluminum compounds in that it has two different physiologically active moieties attached to the same aluminum atom. The salicylate portion of the molecule contributes an analgesic effect, while the nicotinate acid portion contributes peripheral dilatation. Such a combination of physiological properties is of value in the treatment of migraine headache, Meniere's syndrome, tension headache, and rheumatoid arthritis.

The present invention is also concerned with an improved method for the manufacture of the compound hydroxy aluminum nicotinate salicylate which greatly reduces the amount of water required in a reaction medium using the two rather sparingly soluble compounds, nicotinic acid, and salicylic acid.

It is accordingly an object of the present invention to provide a novel organo-derivative of aluminum containing both a salicylic acid moiety and a nicotinic acid moiety.

Still another object of the invention is to provide an improved method for the preparation of the compound hydroxy aluminum nicotinate salicylate.

Other objects and features of the present invention will be apparent to those skilled in the art from the following detailed description.

We have now discovered that the compound hydroxy aluminum nicotinate salicylate can be recovered in good yields by combining substantially equimolar portions of salicylic acid and nicotinic acid, dissolving the combination in water, and thereafter reacting the solution with alcoholic solution of an aluminum alcoholate in which the alcoholate radicals each contain from 2 to 5 carbon atoms. The preferred reactant in our process consists of liquid aluminum isopropoxide in combination with isopropanol, and the preferred temperature range is 70 to 90° C.

Surprisingly, we have discovered that when the synthesis of the compound is carried out in the manner described, substantially smaller quantities of water can be used in the reaction medium. We believe this occurs due to the formation of a salt between the salicylic and nicotinic acid, resulting in a many fold increase in solubility. For example, at 80° C., 100 parts of water will dissolve about 2.5 parts salicylic acid or about 5 parts of nicotinic acid. At the same temperature, 100 parts of water will dissolve at least 52 parts of an equimolar mixture of the two acids. This unique manner of synthesis enables us to reduce the volume of water needed for the reaction and to increase the yield of hydroxy aluminum nicotinate salicylate isolated.

One of the interesting features of the doubly substituted aluminum compound here described is the ability to use an unsubstituted salicylic acid radical in the molecule, making it unnecessary to acetylate the radical, as in the case of ordinary aspirin. Heretofore, salicylic acid was considered useful only as a topical preparation, and found its biggest therapeutic application as a keratolytic agent. It was thought that the acid was so irritating to the gastrointestinal tract that oral administration of a compound containing an unsubstituted salicylic acid moiety was not advisable. In the aluminum compound of this invention, however, the aluminum atom apparently ties up the salicylic acid radical sufficiently so that it is absorbed into the bloodstream without gastrointestinal disturbances.

The nicotinic acid portion of the molecule contributes its vasodilatory property which, together with the analgesic properties characteristic of the salicylate group, provides a material which is particularly useful in maladies such as migraine headache, rheumatoid arthritis, and the like.

Preliminary oral toxicity studies for the new compound have indicated that the lethal oral dose of the material on experimental animals is approximately the same as that for nicotinic acid alone (on the order of 3 to 4 grams per kilogram for male mice).

The following specific example illustrates the manner in which the compound of the present invention may be most conveniently prepared.

Example

Five mols of salicylic acid (690 grams) and 5 mols of nicotinic acid (615 grams) were combined and dissolved in two liters of water heated to 85° C. To this warm solution was added with stirring, a mixture of 5 mols of warm liquid aluminum isopropoxide (1020 grams) and 0.8 liter of anhydrous isopropyl alcohol. The warm slurry was stirred for ½ hour and cooled by the addition of crushed ice. The insoluble salt was collected on a suction funnel and dried in an oven at 110° C. The yield obtained was 1516 grams, at a moisture content of 3.6%. This amounted to a yield of 1461 grams on a dry basis. The theoretical yield for the compound having the empirical formula $C_{13}H_{10}AlNO_6$ would be 1516 grams. The compound was analyzed for aluminum and nitrogen, which values are found to be 8.98% and 4.35% respectively. The theoretical aluminum and nitrogen contents would be 8.91% and 4.62% respectively.

The infrared transmission characteristics of the compound, as determined on a spectrophotometer evidenced minima at wave lengths of about 6.2, 7.0, 8.0, 8.7, 9.7, and 13.1 microns. These correspond to wave numbers of about 1600, 1430, 1250, 1150, 1030, and 1760 reciprocal centimeters, respectively.

The compound of the present invention also has utility in ruminant feeds, where it provides a convenient and readily assimilable source of nicotinic acid.

It should be evident that various modifications can be made to the described embodiments without departing from the scope of the present invention.

We claim as our invention:

1. The compound hydroxy aluminum nicotinate salicylate.

2. The method of preparing the compound hydroxy aluminum nicotinate salicylate which comprises combining substantially equimolar portions of salicylic acid and nicotinic acid, dissolving the combination in water, and thereafter reacting the solution with an alcoholic solution of an aluminum alcoholate, the alcohol of the alcoholic solution and the alcoholate each having the same number of carbon atoms per molecule, and each having two to five carbon atoms each, precipitating the reaction product which results from the reaction, and separating the reaction product thus produced from the remaining liquid.

3. The method of preparing the compound hydroxy aluminum nicotinate salicylate which comprises combining substantially equimolar portions of salicylic acid and nicotinic acid, dissolving the combination in water, thereafter reacting the solution with an isopropanol solution of aluminum isopropoxide, precipitating a reaction product, and separating the reaction product thus produced from the remaining liquid.

4. The method of claim 3 in which the temperature of reaction is from 70 to 90° C.

5. The method of preparing the compound hydroxy aluminum nicotinate salicylate which comprises combining substantially equimolar portions of salicylic acid and nicotinic acid, dissolving the resulting combination in an amount of water which would be insufficient to dissolve the same portions of either of the aforementioned acids completely in the absence of the other acid, thereafter reacting the resulting aqueous solution with an isopropanol solution of aluminum isopropoxide, and recovering the reaction product thus produced.

References Cited by the Examiner
UNITED STATES PATENTS

| | | | |
|---|---|---|---|
| 2,101,867 | 12/1937 | Miller et al. | 167—68 |
| 2,844,551 | 7/1958 | Orthner et al. | 260—270 X |
| 3,100,787 | 8/1963 | Staib | 167—65 |

ALEX MAZEL, *Primary Examiner.*

HENRY R. JILES, *Examiner.*

DONALD G. DAUS, *Assistant Examiner.*